(12) United States Patent
Tazaki

(10) Patent No.: US 6,613,725 B1
(45) Date of Patent: Sep. 2, 2003

(54) REFRIGERATING MACHINE OIL COMPOSITION FOR A CARBON DIOXIDE REFRIGERANT

(75) Inventor: Toshinori Tazaki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/048,475

(22) PCT Filed: Aug. 7, 2000

(86) PCT No.: PCT/JP00/05288

§ 371 (c)(1),
(2), (4) Date: Feb. 8, 2002

(87) PCT Pub. No.: WO01/12763

PCT Pub. Date: Feb. 22, 2001

(30) Foreign Application Priority Data

Aug. 11, 1999 (JP) ............................................. 11-227340

(51) Int. Cl.$^7$ .......................... C10M 107/34; C09K 5/00
(52) U.S. Cl. .......................... 508/579; 252/68; 508/583; 508/539
(58) Field of Search ...................... 252/67, 68; 508/579, 508/583, 539

(56) References Cited

U.S. PATENT DOCUMENTS 6,193,906 B1 * 2/2001 Kaneko et al. ................ 252/68
6,267,907 B1 * 7/2001 Tolfa et al. .................... 252/68
6,306,803 B1 * 10/2001 Tazaka .......................... 252/68

FOREIGN PATENT DOCUMENTS

| EP | 861883 | 9/1998 |
| JP | 10-46169 | 2/1998 |

* cited by examiner

*Primary Examiner*—Jacqueline V. Howard
(74) *Attorney, Agent, or Firm*—Oblon, Spivak, McClelland, Maier & Neustadt, P.C.

(57) ABSTRACT

A refrigerating oil composition for a carbon dioxide refrigerant which comprises as a main component a mixture comprising (A) a polyvinyl ether having a kinematic viscosity of 3 to 50 mm$^2$/s at 100° C. in an amount exceeding 40% by weight and of 99.1% by weight or less and (B) a polyoxyalkylene glycol having a kinematic viscosity of 3 to 50 mm$^2$/s at 100° C. in an amount of 0.1% by weight or more and less than 40% by weight. The composition exhibits an excellent lubricating property and a great viscosity index even when a carbon dioxide refrigerant is used. The composition exhibits excellent stability and an excellent lubricating property under the atmosphere of carbon dioxide in the supercritical condition while the above advantageous properties are maintained and can be used for a long period of time.

20 Claims, 4 Drawing Sheets

REFRIGERATING MACHINE OIL COMPOSITION FOR A CARBON DIOXIDE REFRIGERANT

This application is a 371 of PCT/JP00/05288 Aug. 7, 2000.

TECHNICAL FIELD

The present invention relates to a refrigerating oil composition for a refrigerator using a carbon dioxide ($CO_2$) refrigerant. The refrigerating oil composition can be used for compression-type refrigerators using a carbon dioxide refrigerant which are, specifically, refrigerating and air conditioning apparatuses such as automobile air conditioners, refrigerators, freezers, air conditioners and heat pumps.

BACKGROUND ART

In general, refrigerating cycle of compression-type refrigerators constituted with a compressor, a condenser, an expansion valve and an evaporator has a structure in which a mixed fluid of a refrigerant and a lubricating oil is circulated in the closed system. Heretofore, chlorofluorocarbons such as dichlorodifluoromethane (R-12) and chlorodifluoromethane (R-22) have been used as the refrigerant and various types of lubricating oils have been produced and used in combination with the refrigerant. However, since there is the possibility that the chlorofluorocarbons cause environmental pollution such as ozonosphere destruction in stratosphere when these substances are released into the atmosphere, the regulation on the chlorofluorocarbons is becoming stricter worldwide. Due to this situation, novel refrigerants such as hydrofluorocarbons and fluorocarbons, typical examples of which include 1,1,1,2-tetrafluoroethane (R-134a), are attracting attention. However, there is the possibility that the hydrofluorocarbons and the fluorocarbons might cause global warming due to the long life of these substances in the atmosphere although there is no possibility that these substances cause the above environmental pollution. Therefore, the use of a refrigerant derived from a natural substance which does not cause the above problems is considered.

Carbon dioxide is advantageous since it is harmless to the environment and safe to the human being and has further advantages in that it is easily available anywhere as desired, recycling is not necessary and it is very inexpensive. Therefore, carbon dioxide has heretofore been used as a refrigerant for refrigerators.

With respect to the use of carbon dioxide as the refrigerant, it is disclosed that the sealing property can be improved by using polyvinyl ethers as the refrigerating oil composition for a carbon dioxide refrigerant (Japanese Patent Application Laid-Open No. Heisei 10(1998)-46169).

However, the polyvinyl ethers which are considered to be effective as the refrigerating oil composition for a carbon dioxide refrigerant have a problem due to a small viscosity index in that, when the viscosity is adjusted at a value suitable for surely exhibiting the lubricating property at a high temperature, the viscosity increases at a low temperature and the loss in the power increases.

Therefore, as the lubricant used in combination with the carbon dioxide refrigerant, a refrigerating oil showing a small increase in the viscosity at low temperatures, i.e., a refrigerating oil having a great viscosity index, has been desired.

In the system using the carbon dioxide refrigerant, the refrigerating oil is exposed to carbon dioxide in the supercritical condition since the discharge pressure is higher than that in the system using R-134a or the like and the temperature is higher. Therefore, when a lubricant conventionally used for refrigerants of chlorofluorocarbons, hydrofluorocarbons or fluorocarbons is used for the lubrication, further problems arise in that stability of the lubrication deteriorates and the stable operation for a long period of time cannot be achieved and that a poor lubricating property such as insufficient wear resistance is exhibited.

DISCLOSURE OF THE INVENTION

The present invention has been made to overcome the above problems. The present invention has an object of providing a refrigerating oil composition exhibiting an excellent lubricating property and a great viscosity index even when a refrigerant containing carbon dioxide as the main component is used as the refrigerant.

The present invention has a further object of providing a refrigerating oil composition exhibiting excellent stability and an excellent lubricating property under the atmosphere of carbon dioxide in the supercritical condition while the above advantageous properties are maintained and can be used for a long period of time.

It was found that, when a polyoxyalkylene glycol was used in combination with a polyvinyl ether, the viscosity index of the polyvinyl ether unexpectedly increased and a refrigerating oil composition exhibiting an excellent lubricating property and a great viscosity index could be obtained and that, when specific additives were used in combination with the refrigerating oil composition, the stability and the lubricating property could be improved even under the atmosphere of carbon dioxide in the supercritical condition while viscosity index and excellent miscibility is maintained. The present invention has been completed based on the above knowledge.

The present invention provides:

(1) A refrigerating oil composition for a carbon dioxide refrigerant which comprises as a main component a mixture comprising (A) a polyvinyl ether having a kinematic viscosity in a range of 3 to 50 mm²/s at 100° C. in an amount exceeding 40% by weight and of 99.1% by weight or less and (B) a polyoxyalkylene glycol having a kinematic viscosity in a range of 3 to 50 mm²/s at 100° C. in an amount of 0.1% by weight or more and less than 40% by weight;

(2) A refrigerating oil composition for a carbon dioxide refrigerant described in (1), which has a kinematic viscosity in a range of 3 to 50 mm²/s at 100° C. and a viscosity index of 90 or greater;

(3) A refrigerating oil composition for a carbon dioxide refrigerant described in (1) or (2), wherein the polyoxyalkylene glycol is a compound represented by general formula (I):

$$R^1-[(OR^2)_m-OR^3]_n \qquad (I)$$

wherein $R^1$ represents hydrogen atom, an alkyl group having 1 to 10 carbon atoms, an acyl group having 2 to 10 carbon atoms or an aliphatic hydrocarbon group having 1 to 10 carbon atoms and 2 to 6 bonding portions; $R^2$ represents an alkylene group having 2 to 4 carbon atoms; $R^3$ represents hydrogen atom, an alkyl group having 1 to 10 carbon atoms or an acyl group having 2 to 10 carbon atoms; n represents an integer of 1 to 6; and m represent numbers giving an average value of numbers represented by m×n in a range of 6 to 80;

(4) A refrigerating oil composition for a carbon dioxide refrigerant described in any of (1) to (3), wherein the polyvinyl ether is a compound represented by general formula (V):

wherein $R^{16}$, $R^{17}$ and $R^{18}$ each represents hydrogen atom or a hydrocarbon group having 1 to 8 carbon atoms and the atoms and the groups represented by $R^{16}$, $R^{17}$ and $R^{18}$ may be a same with or different from each other; $R^{19}$ represents a divalent hydrocarbon group having 1 to 10 carbon atoms; $R^{20}$ represents a hydrocarbon group having 1 to 20 carbon atoms; k represents numbers giving an average value in a range of 0 to 10; the atoms and the groups represented by $R^{16}$ to $R^{20}$ may be a same with or different from each other among constituting units; and, when a plurality of $R^{19}O$ are present, the plurality of $R^{19}O$ may represent a same group or different groups;

(5) A refrigerating oil composition for a carbon dioxide refrigerant described in any of (1) to (4), which comprises an acid scavenger;

(6) A refrigerating oil composition for a carbon dioxide refrigerant described in (5), which comprises 0.005 to 5.0% by weight of the acid scavenger;

(7) A refrigerating oil composition for a carbon dioxide refrigerant described in any of (1) to (6), which comprises an extreme pressure agent;

(8) A refrigerating oil composition for a carbon dioxide refrigerant described in (7), wherein the extreme pressure agent is at least one agent selected from metal salts of carboxylic acids and extreme pressure agents having phosphorus;

(9) A refrigerating oil composition for a carbon dioxide refrigerant described in (7) or (8), which comprises 0.001 to 5.0% by weight of the extreme pressure agent; and (10) A refrigerating oil composition for a carbon dioxide refrigerant described in any of (1) to (9), wherein the carbon dioxide refrigerant comprises 90% by weight or more of carbon dioxide.

BRIEF DESCRIPTION OF THE DRAWINGS

In the Figures, 1 means a compressor, 2 means a condenser, 3 means an expansion valve, 4 means an evaporator, 5 means an oil separator, 6 means a hot gas line and 7 means a valve for a hot gas line.

THE MOST PREFERRED EMBODIMENT TO CARRY OUT THE INVENTION

The preferred embodiment of the present invention will be described in the following.

As the first aspect, the present invention provides a refrigerating oil composition for a carbon dioxide refrigerant which comprises as a main component a mixture comprising (A) a polyvinyl ether having a kinematic viscosity in the range of 3 to 50 mm²/s, preferably in the range of 5 to 30 mm²/s and more preferably in the range of 7 to 20 mm²/s at 100° C. in an amount exceeding 40% by weight and of 99.1% by weight or less and (B) a polyoxyalkylene glycol having a kinematic viscosity in the range of 3 to 50 mm²/s, preferably in the range of 5 to 40 mm²/s, more preferably in the range of 7 to 40 mm²/s and most preferably in the range of 7 to 30 mm²/s at 100° C. in an amount of 0.1% by weight or more and less than 40% by weight.

The kinematic viscosity of the above components are limited in the above ranges based on the following reasons. The lower limit is set so that the kinematic viscosity of the refrigerating oil composition for a carbon dioxide refrigerant which comprises the mixture of the components is kept at an appropriate value and the lubricating property can be exhibited. The upper limit is set so that the practical operation of the refrigerating apparatus is not adversely effected by the power loss.

The kinematic viscosity of the refrigerating oil composition for a carbon dioxide refrigerant of the present invention which comprises a mixture comprising component (A) and component (B) is selected in the range of 3 to 50 mm²/s, preferably in the range of 5 to 40 mm²/s and more preferably in the range of 7 to 30 mm²/s. The viscosity index is selected in the range of 90 or greater and more preferably in the range of 95 or greater. When the viscosity index of the refrigerating oil composition is smaller than 90, occasionally, the effect of adding the polyalkylene glycol is not exhibited substantially and the object of obtaining the suitable viscosity index is not achieved.

The amounts of the polyvinyl ether of component (A) and the polyoxyalkylene glycol of component (B) in the mixture are as follows. The amount of component (A) is selected in the range exceeding 40% by weight and of 99.1% by weight or less and the amount of component (B) is selected in the range of 0.1% by weight or more and less than 40% by weight. It is preferable that the amount of component (A) is selected in the range exceeding 60% by weight and of 97% by weight or less and the amount of component (B) is selected in the range of 3% by weight or more and less than 40% by weight. It is more preferable that the amount of component (A) is selected in the range exceeding 60% by weight and of 95% by weight or less and the amount of component (B) is selected in the range of 5% by weight or more and less than 40% by weight. When the amount of component (B) is smaller than the above range, the effect of improving the viscosity index of the refrigerating oil composition is not sufficiently exhibited. When the amount of component (B) exceeds the above range, two phase separation temperature is lowered, i.e., the immiscible range increases.

In the present invention, examples of the polyoxyalkylene glycol used as component (B) include compounds represented by general formula (I):

$$R^1-[(OR^2)_m-OR^3]_n \qquad (I)$$

wherein $R^1$ represents hydrogen atom, an alkyl group having 1 to 10 carbon atoms, an acyl group having 2 to 10 carbon atoms or an aliphatic hydrocarbon group having 1 to 10 carbon atoms and 2 to 6 bonding portions; $R^2$ represents an alkylene group having 2 to 4 carbon atoms; $R^3$ represents hydrogen atom, an alkyl group having 1 to 10 carbon atoms or an acyl group having 2 to 10 carbon atoms; n represents an integer of 1 to 6; and m represents numbers giving an average value of numbers represented by m×n in a range of 6 to 80.

In the above general formula (I), the alkyl group having 1 to 10 carbon atoms represented by $R^1$ or $R^3$ may be any of linear, branched and cyclic alkyl groups. Examples of the alkyl group include methyl group, ethyl group, n-propyl group, isopropyl group, various types of butyl group, various types of pentyl group, various types of hexyl group, various types of heptyl group, various types of octyl group, various types of nonyl group, various types of decyl group, cyclopentyl group and cyclohexyl group. When the number of carbon atom in the alkyl group exceeds 10, miscibility with the refrigerant decreases and phase separation occasionally takes place. It is preferable that the number of carbon atom in the alkyl group is 1 to 6.

In the acyl group having 2 to 10 carbon atoms represented by any of $R^1$ and $R^3$, the portion of an alkyl group may be any of linear, branched or cyclic alkyl groups. Examples of the portion of an alkyl group in the acyl group include the alkyl groups having 1 to 9 carbon atoms among the groups described above as the examples of the alkyl group. When the number of carbon atom in the acyl group exceeds 10, miscibility with the refrigerant decreases and phase separation occasionally takes place. It is preferable that the number of carbon atom in the alkyl group is 2 to 6.

When $R^1$ and $R^3$ each represents an alkyl group or an acyl group, $R^1$ and $R^3$ may represent the same group or different groups.

When n represents a number of 2 or greater, the atoms and the groups represented by the plurality of $R^3$ in one molecule may be the same with or different from each other.

When $R^1$ represents an aliphatic hydrocarbon group having 1 to 10 carbon atoms and 2 to 6 bonding portions, the aliphatic hydrocarbon group may be linear or cyclic. Examples of the aliphatic hydrocarbon having 2 bonding portions include ethylene group, propylene group, butylene group, pentylene group, hexylene group, heptylene group, octylene group, nonylene group, decylene group, cyclopentylene group and cyclohexylene group. Examples of the aliphatic hydrocarbon group having 3 to 6 bonding portions include residual groups obtained by removing hydroxyl groups from polyhydric alcohols such as trimethylolpropane, glycerol, pentaerythritol, sorbitol, 1,2,3-trihydroxycyclohexane and 1,3,5-trihydroxycyclohexane.

When the number of carbon atoms in the aliphatic hydrocarbon groups exceeds 10, miscibility with the refrigerant decreases and phase separation occasionally takes place. It is preferable that the number of carbon atom is 2 to 6.

In the present invention, it is preferable that at least one of $R^1$ and $R^3$ represents an alkyl group, more preferably an alkyl group having 1 to 3 carbon atoms and most preferably methyl group from the standpoint of the viscosity. From the same standpoint, it is preferable that both of $R^1$ and $R^3$ represent an alkyl group and more preferably methyl group.

In the above general formula (I), $R^2$ represents an alkylene group having 2 to 4 carbon atoms. Examples of the oxyalkylene group as the repeating unit include oxylethylene group, oxypropylene group and oxybutylene group. The oxyalkylene groups in one molecule may be the same with each other or may comprise two or more types of oxyalkylene groups. It is preferable that the polyoxyalkylene glycol is a copolymer comprising oxyethylene group (EO) and oxypropylene group (PO). From the standpoint of the load of seizure and the viscosity, it is preferable that the value of EO/(PO+EO) is in the range of 0.1 to 0.8. From the standpoint of the hygroscopic property, it is preferable that the value of EO/(PO+EO) is in the range of 0.3 to 0.6.

In the above general formula (I), n represents an integer of 1 to 6 which is decided in accordance with the number of the bonding portion of the group represented by $R^1$. For example, n represents 1 when $R^1$ represents an alkyl group or an acyl group and 2,3,4,5 or 6 when $R^1$ represents an aliphatic hydrocarbon group having 2,3,4,5 or 6 bonding portions, respectively. In the general formula (I), m represents numbers giving an average value of numbers represented by m×n in the range of 6 to 80. When the average value of m×n exceeds the above range, the object of the present invention is not sufficiently achieved, occasionally.

The polyalkylene glycol represented by the above general formula (I) include polyalkylene glycols having hydroxyl groups at the chain ends. Polyalkylene glycol having hydroxyl groups at the chain ends can be advantageously used as long as the content of the hydroxyl group at the chain ends is 50% by mole or smaller based on the total number of the groups at the chain ends. When the above content exceeds 50% by mole, the hygroscopic property increases and the viscosity index decreases. Therefore, such a content is not preferable.

As the polyalkylene glycol described above, polyoxypropylene glycol dimethyl ethers represented by general formula:

wherein x represents a number of 6 to 80, and polyoxyethylene-polyoxypropylene glycol dimethyl ethers represented by general formula:

wherein a and b each represents a number of 1 or greater and the sum of the numbers represented by a and b is in the range of 6 to 80, are preferable from the standpoint of the economy and the effect; and polyoxypropylene glycol monobutyl ethers represented by general formula and polyoxypropylene glycol diacetates:

wherein x represents a number of 6 to 80, are preferable from the standpoint of the economy.

Examples of the polyoxyalkylene glycol compound represented by the general formula (I) include all the compounds described in detail in Japanese Patent Application Laid-Open No. Heisei 2(1990)-305893.

In the present invention, polyoxyalkylene glycol derivatives having at least one constituting unit represented by the following general formula (II):

(II)

can be used. In general formula (II), $R^4$ to $R^7$ each represents hydrogen atom, a monovalent hydrocarbon group having 1 to 10 carbon atoms or a group represented by general formula (III):

(III)

and at least one of $R^4$ to $R^7$ represents a group represented by general formula (III). In general formula (III), $R^8$ and $R^9$ each represent hydrogen atom, a monovalent hydrocarbon group having 1 to 10 carbon atoms or an alkoxyalkyl group having 2 to 20 carbon atoms, $R^{10}$ represents an alkylene group having 2 to 5 carbon atoms, a substituted alkylene group having alkyl groups as the substituents and 2 to 5 total carbon atoms or a substituted alkylene group having alkoxyalkyl groups as the substituents and 4 to 10 total carbon atoms, n represents an integer of 0 to 20 and $R^{11}$ represents a monovalent hydrocarbon group having 1 to 10 carbon atoms. In the above general formula (II), $R^4$ to $R^7$ each represents hydrogen atom, a monovalent hydrocarbon group having 1 to 10 carbon atoms or a group represented by general formula (III). As the monovalent hydrocarbon group having 1 to 10 carbon atoms, monovalent hydrocarbon groups having 6 or less carbon atoms are preferable and alkyl groups having 3 or less carbon atoms are more preferable.

In general formula (III), $R^8$ and $R^9$ each represents hydrogen atom, a monovalent hydrocarbon group having 1 to 10 carbon atoms or an alkoxyalkyl group having 2 to 20 carbon atoms. Among these groups, alkyl groups having 3 or less carbon atoms and alkoxyalkyl groups having 6 or less carbon atoms are preferable.

$R^{10}$ represents an alkylene group having 2 to 5 carbon atoms, a substituted alkylene group having alkyl groups as the substituents and 2 to 5 total carbon atoms or a substituted alkylene group having alkoxyalkyl groups as the substituents and 4 to 10 total carbon atoms. It is preferable that $R^{10}$ represents ethylene group or a substituted ethylene group having 6 or less carbon atoms.

$R^{11}$ represents a monovalent hydrocarbon group having 1 to 10 carbon atoms, preferably a hydrocarbon group having 6 or less carbon atoms and more preferably a hydrocarbon group having 3 or less carbon atoms.

In the above general formula (II), at least one of $R^4$ to $R^7$ represents the group represented by the above general formula (III). It is preferable that one of $R^4$ and $R^6$ represents the group represented by general formula (III) and the other of $R^4$ and $R^6$, $R^5$ and $R^7$ each represents hydrogen atom or a monovalent hydrocarbon group having 1 to 10 carbon atoms.

The polyoxyalkylene glycol derivative comprises at least one constituting unit represented by general formula (II). The polyalkylene glycol derivatives can be divided into the following three compounds: homopolymers comprising a single type of the constituting unit represented by general formula (II); copolymers comprising two or more types of the constituting units represented by general formula (II); and copolymers comprising the constituting units represented by general formula (II) and other constituting units such as constituting units represented by general formula (IV):

(IV)

wherein $R^{12}$ to $R^{15}$ each represents hydrogen atom or an alkyl group having 1 to 3 carbon atoms.

Examples of the homopolymer described above include homopolymers comprising 1 to 200 constituting units represented by general formula (II) and having hydroxyl group, an acyloxyl group having 1 to 10 carbon atoms, an alkoxyl group having 1 to 10 carbon atoms or an aryloxyl groups at each chain end.

Examples of the copolymer include copolymers which comprise two types of constituting units (A) and (B) each represented by general formula (II) each in a number of 1 to 200 and copolymers which comprise 1 to 200 constituting units (A) represented by general formula (II) and 1 to 200 constituting units (C) represented by general formula (III), each copolymer having hydroxyl group, an acyloxyl group having 1 to 10 carbon atoms, an alkoxyl group having 1 to 10 carbon atoms or an aryloxyl groups at each chain end. The above copolymers include alternating copolymers, random copolymers and block copolymers comprising constituting units A and constituting units B (or constituting units C) and graft copolymers comprising the main chain comprising constituting units A to which constituting units B are grafted.

Examples of the polyvinyl ether used as component (A) of the present invention include polyvinyl ether compounds comprising constituting units represented by general formula (V):

(V)

wherein $R^{16}$, $R^{17}$ and $R^{18}$ each represent hydrogen atom or a hydrocarbon group having 1 to 8 carbon atoms and the atoms and the groups represented by $R^{16}$, $R^{17}$ and $R^{18}$ may be the same with or different from each other; $R^{19}$ represents a divalent hydrocarbon group having 1 to 10 carbon atoms; $R^{20}$ represents a hydrocarbon group having 1 to 20 carbon atoms; k represents numbers giving an average value in a range of 0 to 10; the atoms and the groups represented by $R^{16}$ to $R^{20}$ may be the same with or different from each other among the constituting units; and, when a plurality of $R^{19}O$ are present, the plurality of $R^{19}O$ may represent a same group or different groups.

Polyvinyl ether compounds which are block or random copolymers comprising the constituting units represented by general formula (V) and constituting units represented by the following general formula (VI):

(VI)

can also be used. In general formula (VI), $R^{21}$ to $R^{24}$ each represents hydrogen atom or a hydrocarbon group having 1 to 20 carbon atoms. The atoms and the groups represented by $R^{21}$ to $R^{24}$ may be the same with or different from each other. The atoms and the groups represented by $R^{21}$ to $R^{24}$ may be the same with or different each other among the constituting units.

In the above general formula (V), $R^{16}$, $R^{17}$ and $R^{18}$ each represents hydrogen atom or a hydrocarbon group having 1 to 8 carbon atoms and preferably 1 to 4 carbon atoms. The atoms and the groups represented by $R^{16}$, $R^{17}$ and $R^{18}$ may the same with or different from each other. Examples of the hydrocarbon group include alkyl groups such as methyl group, ethyl group, n-propyl group, isopropyl group, n-butyl group, isobutyl group, sec-butyl group, tert-butyl group, various types of pentyl group, various types of hexyl group, various types of heptyl group and various types of octyl group; cycloalkyl groups such as cyclopentyl group, cyclohexyl group, various types of methylcyclohexyl group, various types of ethylcyclohexyl group and various types of dimethylcyclohexyl group; aryl groups such as phenyl group, various types of methylphenyl group, various types of ethylphenyl group and various types of dimethylphenyl group; and arylalkyl groups such as benzyl group, various types of phenylethyl group and various types of methylbenzyl group. It is preferable that $R^{16}$, $R^{17}$ and $R^{18}$ each represents hydrogen atom.

In general formula (V), $R^{19}$ represents a divalent hydrocarbon group having 1 to 10 carbon atoms and preferably 2 to 10 carbon atoms. Examples of the divalent hydrocarbon group having 1 to 10 carbon atoms include divalent aliphatic groups such as methylene group, ethylene group, phenylethylene group, 1,2-propylene group, 2-phenyl-1,2-propylene group, 1,3-propylene group, various types of butylene group, various types of pentylene group, various types of hexylene group, various types of heptylene group, various types of octylene group, various types of nonylene group and various types of decylene groups; alicyclic groups having two bonding portions on alicyclic hydrocarbons such as cyclohexane, methylcyclohexane, ethylcyclohexane, dimethylcyclohexane and propylcyclohexane; divalent aromatic hydrocarbon groups such as various types of phenylene group, various types of methylphenylene group, various types of ethylphenylene group, various types of dimethylphenylene group and various types of naphthylene group; alkylaromatic groups having one monovalent bonding portion on each of the alkyl portion and the aromatic portion of alkylaromatic hydrocarbons such as toluene, xylene and ethylbenzene; and alkylaromatic groups having bonding portions on the alkyl group portions of polyalkylaromatic hydrocarbons such as xylene and diethylbenzene. Among the above groups, aliphatic groups having 2 to 4 carbon atoms are preferable.

In general formula (V), k represents numbers showing the repeating number of the group represented by $R^{19}O$ and the average value thereof is in the range of 0 to 10 and preferably in the range of 0 to 5. When a plurality of $R^{19}O$ are present, the plurality of $R^{19}O$ may represent a same group or different groups In general formula (V), $R^{20}$ represents a hydrocarbon group having 1 to 20 carbon atoms and preferably 1 to 10 carbon atoms. Examples of the hydrocarbon group include alkyl groups such as methyl group, ethyl group, n-propyl group, isopropyl group, n-butyl group, isobutyl group, sec-butyl group, tert-butyl group, various types of pentyl group, various types of hexyl group, various types of heptyl group, various types of octyl group, various types of nonyl groups and various types of decyl group; cycloalkyl groups such as cyclopentyl group, cyclohexyl group, various types of methylcyclohexyl group, various types of ethylcyclohexyl group, various types of propylcyclohexyl group and various types of dimethylcyclohexyl group; aryl groups such as phenyl group, various types of methylphenyl group, various types of ethylphenyl group, various types of dimethylphenyl group, various types of propylphenyl group, various types of trimethyl-phenyl group, various types of butylphenyl group and various types of naphthyl group; and arylalkyl groups such as benzyl group, various types of phenylethyl group, various types of methylbenzyl group, various types of phenylpropyl group and various types of phenylbutyl group.

The atoms and the groups represented by $R^{16}$ to $R^{20}$ may be the same with or different each other among the constituting units.

It is preferable that, in the polyvinyl ether compound (1) comprising the constituting units represented by general formula (V), the ratio of the amounts by mole of carbon to oxygen is in the range of 4.2 to 7.0. When the ratio is smaller than 4.2, the compound is hygroscopic. When the ratio exceeds 7.0, the miscibility with the refrigerant occasionally decreases.

In the above general formula (VI), $R^{21}$ to $R^{24}$ each represents hydrogen atom or a hydrocarbon group having 1 to 20 carbon atoms. The atoms and the groups represented by $R^{21}$ to $R^{24}$ may be the same with or different from each other. Examples of the hydrocarbon group having 1 to 20 carbon atoms include the groups described as the examples of the group represented by $R^{20}$ in the above general formula (V). The atoms and the groups represented by $R^{21}$ to $R^{24}$ in different constituting units may be the same with or different each other.

In the present invention, a mixture of the above polyvinyl ether compound (1) and the above polyvinyl ether compound (2) can also be used.

Polyvinyl ether compounds (1) and (2) used in the present invention can be produced by polymerization of the corresponding vinyl ether monomers and by copolymerization of the corresponding hydrocarbon monomer having an olefinic double bond and the corresponding vinyl ether monomer, respectively.

As the polyvinyl ether compound used in the present invention, following compounds are preferable:

Polyvinyl ether compounds which have one chain end having the structure represented by general formula (VII) or (VIII):

wherein $R^{25}$, $R^{26}$ and $R^{27}$ each represents hydrogen atom or a hydrocarbon group having 1 to 8 carbon atoms, the atoms and the groups represented by $R^{25}$, $R^{26}$ and $R^{27}$ may be the same with or different from each other, $R^{30}$, $R^{31}$, $R^{32}$ and $R^{33}$ each represents hydrogen atom or a hydrocarbon group having 1 to 20 carbon atom, the atoms and the groups represented by $R^{30}$, $R^{31}$, $R^{32}$ and $R^{33}$ may be the same with or different from each other, $R^{28}$ represents a divalent hydrocarbon group having 1 to 10 carbon atoms, $R^{29}$ represents a hydrocarbon group having 1 to 20 carbon atoms, p represents numbers giving an average value of 0 to 10 and, when a plurality of $R^{28}O$ are present, the plurality of $R^{28}O$ may represent the same group or different groups, and the other chain end having the structure represented by general formula (IX) or (X):

(X)

wherein $R^{34}$, $R^{35}$ and $R^{36}$ each represents hydrogen atom or a hydrocarbon group having 1 to 8 carbon atoms, the atoms and the groups represented by $R^{34}$, $R^{35}$ and $R^{36}$ may be the same with or different from each other, $R^{39}$, $R^{40}$, $R^{41}$ and $R^{42}$ each represents hydrogen atom or a hydrocarbon group having 1 to 20 carbon atom, the atoms and the groups represented by $R^{39}$, $R^{40}$, $R^{41}$ and $R^{42}$ may be the same with or different from each other, $R^{37}$ represents a divalent hydrocarbon group having 1 to 10 carbon atoms, $R^{38}$ represents a hydrocarbon group having 1 to 20 carbon atoms, q represents numbers giving an average value of 0 to 10 and, when a plurality of $R^{37}O$ are present, the plurality of $R^{37}O$ may represent the same group or different groups; and Polyvinyl ether compounds which have one chain end having the structure represented by the above general formula (VII) or (VIII) and the other chain end having the structure represented by general formula (XI):

(XI)

wherein $R^{43}$, $R^{44}$ and $R^{45}$ each represents hydrogen atom or a hydrocarbon group having 1 to 8 carbon atoms and the atoms and the groups represented by $R^{43}$, $R^{44}$ and $R^{45}$ may be the same with or different from each other.

Among the above polyvinyl ether compounds, the following compounds are preferably used in the present invention:

(1) Compounds which have one chain end having the structure represented by general formula (VII) or (VIII) and the other chain end having the structure represented by general formula (IX) or (X) and comprise the structural units represented by general formula (V) in which $R^{16}$, $R^{17}$ and $R^{18}$ each represents hydrogen atoms, k represents number of 0 to 4, $R^{19}$ represents a divalent hydrocarbon group having 2 to 4 carbon atoms and $R^{20}$ represents a hydrocarbon group having 1 to 20 carbon atoms;

(2) Compounds which comprise the structural units represented by general formula (V) alone and have one chain end having the structure represented by general formula (VII) and the other chain end having the structure represented by general formula (IX), wherein $R^{16}$, $R^{17}$ and $R^{18}$ in general formula (V) each represents hydrogen atom, k represents number of 0 to 4, $R^{19}$ represents a divalent hydrocarbon group having 2 to 4 carbon atoms and $R^{20}$ represents a hydrocarbon group having 1 to 20 carbon atoms;

(3) Compounds which have one chain end having the structure represented by general formula (VII) or (VIII) and the other chain end having the structure represented by general formula (XI) and comprise the structural units represented by general formula (V) in which $R^{16}$, $R^{17}$ and $R^{18}$ each represents hydrogen atom, k represents number of 0 to 4, $R^{19}$ represents a divalent hydrocarbon group having 2 to 4 carbon atoms and $R^{20}$ represents a hydrocarbon group having 1 to 20 carbon atoms; and (4) Compounds which comprise the structural units represented by general formula (V) alone and have one chain end having the structure represented by general formula (VII) and the other chain end having the structure represented by general formula (X), wherein $R^{16}$, $R^{17}$ and $R^{18}$ in general formula (V) each represents hydrogen atom, k represents number of 0 to 4, $R^{19}$ represents a divalent hydrocarbon group having 2 to 4 carbon atoms and $R^{20}$ represents a hydrocarbon group having 1 to 20 carbon atoms.

In the present invention, polyvinyl ether compounds comprising the structural unit represented by general formula (V) and having one chain end having the structure represented by the above general formula (VII) and the other chain end having the structure represented by the following general formula (XII):

(XII)

can also be used. In general formula (XII), $R^{46}$, $R^{47}$ and $R^{48}$ each represents hydrogen atom or a hydrocarbon group having 1 to 8 carbon atoms and the atoms or the groups represented by $R^{46}$, $R^{47}$ and $R^{48}$ may be the same with or different from each other; $R^{49}$ and $R^{50}$ each represents a divalent hydrocarbon group having 2 to 10 carbon atoms and may represent the same group or different groups; $R^{50}$ and $R^{52}$ each represents a hydrocarbon group having 1 to 10 carbon atoms and may represent the same group or different groups; c and d each represents numbers giving an average value of 0 to 10 and may represent the same number or different numbers; when a plurality of $R^{49}O$ are present, the plurality of $R^{49}O$ may represent the same group or different groups; and, when a plurality of $R^{51}O$ are present, the plurality of $R^{51}O$ represent the same group or different groups.

Further examples of the polyvinyl ether compounds which can be used in the present invention include homopolymers or copolymers of alkyl vinyl ethers comprising structural units represented by general formula (XIII) or (XIV):

(XIII)

(XIV)

wherein $R^{53}$ represents a hydrocarbon group having 1 to 8 carbon atoms, having a weight-average molecular weight of 300 to 5,000 and having one chain end having the structure represented by general formula (XV) or (XVI):

(XV)

(XVI)

wherein $R^{54}$ represents an alkyl group having 1 to 3 carbon atoms and $R^{55}$ represents a hydrocarbon group having 1 to 8 carbon atoms.

Still further examples of the polyvinyl ether compound described above include the compounds described in detail in Japanese Patent Application Laid-Open Nos. Heisei 6(1994)-128578, Heisei 6(1994)-234814 and Heisei 6(1994)-234815 and Japanese Patent Application No. Heisei 5(1993)-303736.

The refrigerating oil composition as the first aspect of the present invention comprises as a main component the mixture of component (A) and component (B) in specific amounts and may further comprise polyesters such as polyol esters, esters of carbonic acid, mineral oils and hydrocarbons such as poly-α-olefins.

The refrigerating oil composition as the second aspect of the present invention comprises an acid scavenger or at least one of an acid scavenger and an extreme pressure agent in combination with the refrigerating oil composition described above as the first aspect of the present invention.

In the second aspect of the present invention, due to the presence of the acid scavenger, stability can be improved under the condition exposed to carbon dioxide in the supercritical condition while the excellent miscibility with the refrigerant is maintaine d. The stability and the lubricating property can be further improved due to the combined use of the extreme pressure agent with the acid scavenger.

Examples of the acid scavenger used in the present invention include epoxy compounds such as phenyl glycidyl ether, alkyl glycidyl ethers, alkylene glycol glycidyl ethers, cyclohexene oxide, α-olefin oxides and epoxidized soy bean oil. Among the above acid scavengers, phenyl glycidyl ether, alkyl glycidyl ethers, alkylene glycol glycidyl ethers, cyclohexene oxide, α-olefin oxides are preferable from the standpoint of the miscibility.

The alkyl group in the alkyl glycidyl ether and the alkylene group in the alkylene glycidyl ether may be branched and have, in general, 3 to 30 carbon atoms, preferably 4 to 24 carbon atoms and more preferably 6 to 16 carbon atoms. As the a-olefin oxide, compounds having, in general, 4 to 30 total carbon atoms, preferably 4 to 24 total carbon atoms and more preferably 6 to 16 total carbon atoms can be used.

In the present invention, the acid scavenger may be used singly or in combination of two or more. It is preferable that the amount is selected in the range of 0.005 to 5% by weight and more preferably in the range of 0.05 to 3% by weight. When the amount is less than 0.005% by weight, there is the possibility that the effect of adding the acid scavenger is not exhibited. When the amount exceeds 5% by weight, there is the possibility that sludge is formed.

As the extreme pressure agent, metal salts of carboxylic acids can be used. Examples of the metal salts of carboxylic acids include metal salts of carboxylic acids having 3 to 60 carbon atoms, preferably metal salts of fatty acids having 3 to 30 carbon atoms and more preferably metal salts of fatty acids having 12 to 30 carbon atoms. Further examples of the metal salts of carboxylic acids include metal salts of dimer acids and trimer acids of the fatty acids described above and metal salts of dicarboxylic acids having 3 to 30 carbon atoms. Among these metal salts of carboxylic acids, metal salts of fatty acids having 12 to 30 carbon atoms and metal salts of dicarboxylic acids having 3 to 30 carbon atoms are preferable.

As the metal constituting the metal salt of a carboxylic acid, alkali metals and alkaline earth metals are preferable and alkali metals are more preferable.

Examples of the carboxylic acid constituting the metal salt of a carboxylic acid include various carboxylic acids such as saturated aliphatic carboxylic acids, unsaturated aliphatic carboxylic acids, aliphatic dicarboxylic acids and aromatic carboxylic acids. Examples of the saturated aliphatic carboxylic acid include linear saturated fatty acids such as caproic acid, caprylic acid, capric acid, lauric acid, myristic acid, palmitic acid, stearic acid, arachic acid, cerotic acid and laccelic acid; and branched fatty acids such as isopentanoic acid, 2-methylpentanoic acid, 2-methylbutanoic acid, 2,2-dimethylbutanoic acid, 2-methylhexanoic acid, 5-methylhexanoic acid, 2,2-dimethylheptanoic acid, 2-ethyl-2-methyl-butanoic acid, 2-ethylhexanoic acid, dimethylhexanoic acid, 2-n-propylpentanoic acid, 3,5,5-trimethylhexanoic acid, dimethyloctanoic acid, isotridecanoic acid, isomyristic acid, isostearic acid, isoarachic acid and isohexanoic acid. Examples of the unsaturated aliphatic carboxylic acid include palmitoleic acid, oleic acid, elaidic acid, linolic acid, linolenic acid and unsaturated hydroxycarboxylic acids such as ricinolic acid. Examples of the aliphatic dicarboxylic acid include adipic acid, azelaic acid and sebacic acid. Examples of the aromatic carboxylic acid include benzoic acid, phthalic acid, trimellitic acid and pyromellitic acid. Further examples of the carboxylic acid include alicyclic fatty acids such as naphthenic acid. The carboxylic acid may be used singly or in combination of two or more.

The metal constituting the metal salt of a carboxylic acid is not particularly limited and various metals can be used. Examples of the metal include alkali metals such as lithium, potassium and sodium; alkaline earth metals such as magnesium, calcium and strontium and other metals such as zinc, nickel and aluminum. Among the above metals, alkali metals and alkaline earth metals are preferable and alkali metals are more preferable. A single metal or a combination of two or more metals may be used in combination with one carboxylic acid described above.

In the refrigerating oil composition of the present invention, the amount of the metal salt of a carboxylic acid described above is preferably in the range of 0.001 to 5% by weight and more preferably in the range of 0.005 to 3% by weight. When the amount is less than 0.001% by weight, wear resistance is not sufficient. When the amount exceeds 5% by weight, stability occasionally decreases.

As for the process for producing the composition of the present invention comprising the metal salt of a carboxylic acid, it is sufficient that the metal salt of a carboxylic acid is mixed into a refrigerating oil composition (a base oil) comprising components (A) and (B) described above and a process can be selected from various processes for producing the composition. It is effective that the composition is produced in accordance with the following process since solubility of the metal salts of a carboxylic acid into the base oil can be improved. The carboxylic acid and an alkali hydroxide are placed into a solvent and a mixture in which the metal salt of the carboxylic acid is dissolved or dispersed is formed by the reaction at the room temperature or under heating so that the metal salt of the carboxylic acid can be dissolved or dispersed in the solvent in advance. The metal salt of the carboxylic acid dissolved or dispersed in the solvent is added to, mixed with and dispersed into the base oil without further treatments. By dissolving or dispersing the metal salt of the carboxylic acid into the solvent in advance and adding the obtained solution or dispersion of the metal salt of the carboxylic acid into the base oil, the object composition can be efficiently produced.

As the solvent used above, various solvents can be used. Examples of the solvent include monohydric alcohols such as n-butyl alcohol, isobutyl alcohol, sec-butyl alcohol, t-butyl alcohol, n-amyl alcohol, isoamyl alcohol, sec-amyl alcohol, n-hexyl alcohol, methylamyl alcohol, ethylbutyl alcohol, heptyl alcohol, n-octyl alcohol, sec-octyl alcohol, 2-ethylhexyl alcohol, isooctyl alcohol, n-nonyl alcohol, 2,6-dimethyl-4-heptanol, n-decyl alcohol and cyclohexanol; glycols and polyhydric alcohols such as ethylene glycol, diethylene glycol, triethylene glycol, tetraethylene glycol, propylene glycol, dipropylene glycol, 1,4-butylene glycol, 2,3-butylene glycol, hexylene glycol, octylene glycol and glycerol; cellosolves such as ethylene glycol monomethyl ether, ethylene glycol ethyl ether, ethylene glycol diethyl ether, ethylene glycol butyl ether, ethylene glycol dibutyl ether, ethylene glycol phenyl ether, ethylene glycol benzyl ether, ethylene glycol ethyl hexyl ether, diethylene glycol ethyl ether, diethylene glycol diethyl ether, diethylene glycol butyl ether, diethylene glycol dibutyl ether, propylene glycol methyl ether, propylene glycol ethyl ether, propylene glycol butyl ether, dipropylene glycol methyl ether, dipropylene glycol ethyl ether, tripropylene glycol methyl ether, tetraethylene glycol dimethyl ether and tetraethylene glycol dibutyl ether; crown ethers such as benzo-15-crown-5, benzo-12-crown-4, benzo-18-crown-6 and dibenzo-18-crown-6; ketones such as ethyl butyl ketone, dipropyl ketone, methyl amyl ketone, methyl hexyl ketone and diisobutyl ketone; and fatty acids such as fatty acids having 3 to 30 carbon atoms described above.

The concentration of the metal salt of a carboxylic acid dissolved or dispersed into the above solvent is not particularly limited and can be suitably selected in accordance with the situation.

Further examples of the extreme pressure agent used in the present invention include extreme pressure agents having phosphorus such as esters of phosphoric acid, acidic esters of phosphoric acid, esters of phosphorous acid, acidic eaters of phosphorous acid and amine salts of these esters. Examples of the esters of phosphoric acid include triaryl phosphates, trialkyl phosphates, trialkylaryl phosphates, triarylalkyl phosphates and trialkenyl phosphates. Specific examples of the esters of phosphoric acid include triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate and trioleyl phosphate.

Examples of the acidic ester of phosphoric acid include 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate and isostearyl acid phosphate.

Examples of the ester of phosphorous acid include triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenyl isodecyl phosphite, tristearyl phosphite, trioleyl phosphite and 2-ethylhexyl diphenyl phosphite.

Examples of the acidic ester of phosphorous acid include dibutyl hydrogenphosphite, dilauryl hydrogenphosphite, dioleyl hydrogen-phosphite, distearyl hydrogenphosphite and diphenyl hydrogenphosphite.

Examples of the amines forming amine salts with the above esters include monosubstituted amines, disubstituted amines and trisubstituted amines represented by general formula (XVII):

$$R_sNH_{3-s} \quad \text{(XVII)}$$

wherein R represents an alkyl group or an alkenyl group having 3 to 30 carbon atoms, an aryl group or an aralkyl group having 6 to 30 carbon atoms or a hydroxyalkyl group having 2 to 30 carbon atoms, s represents a number of 1, 2 or 3 and, when a plurality of R are present, the plurality of R may represent the same group or different groups. The alkyl group and the alkenyl group having 3 to 30 carbon atoms which are represented by R in general formula (XVII) may be any of linear groups, branched groups and cyclic groups.

Examples of the monosubstituted amine include butylamine, pentylamine, hexylamine, cyclohexylamine, octylamine, laurylamine, stearylamine, oleylamine and benzylamine. Examples of the disubstituted amine include dibutylamine, dipentylamine, dihexylamine, dicyclohexylamine, dioctylamine, dilaurylamine, distearylamine, dioleylamine, dibenzylamine, stearylmonoethanolamine, decyl-monoethanolamine, hexylmonopropanolamine, benzylmonoethanolamine, phenylmonoethanolamine and tolylmonopropanolamine. Examples of the trisubstituted amine include tributylamine, tripentylamine, trihexylamine, tricyclohexylamine, trioctylamine, trilaurylamine, tristearylamine, trioleylamine, tribenzylamine, dioleylmonoethanolamine, dilaurylmonopropanolamine, dioctylmonoethanolamine, dihexylmonopropanolamine, dibutylmonopropanolamine, oleyldiethanolamine, stearyldipropanolamine, lauryldiethanolamine, octyldipropanolamine, butyldiethanolamine, benzyldiethanolamine, phenyldiethanolamine, tolyldipropanolamine, xylyldiethanolamine, triethanolamine and tripropanolamine.

Among these extreme pressure agents, tricresyl phosphate, tri(nonylphenyl) phosphite, dioleyl hydrogenphosphite and 2-ethylhexyl diphenyl phosphite are preferable from the standpoint of the extreme pressure property and the friction property.

Still further examples of the extreme pressure agents include extreme pressure agents having sulfur such as vulcanized oils and fats, vulcanized fatty acids, vulcanized esters, olefin sulfides, dihydrocarbyl polysulfides, thiocarbamates, thioterpenes and dialkyl thiodipropionates. The vulcanized oils and fats can be obtained by the reaction of sulfur or a compound having sulfur with oils and fats such as lard oil, whale oil, plant oils and fish oils. The content of sulfur is not particularly limited. In general, vulcanized oils and fats containing 5 to 30% by weight of sulfur is preferably used. Examples of the vulcanized oils and fats include vulcanized lard, vulcanized rapeseed oil, vulcanized castor oil, vulcanized soy bean oil and vulcanized rice bran oil. Examples of the vulcanized fatty acid include vulcanized oleic acid. Examples of the vulcanized ester include vulcanized methyl oleate and vulcanized octyl ester of fatty acids of rice bran.

Examples of the olefin sulfide include compounds represented by the following general formula (XVIII):

$$R^{56}-S_t-R^{57} \quad \text{(XVIII)}$$

wherein $R^{56}$ represents an alkenyl group having 2 to 15 carbon atoms, $R^{57}$ represents an alkyl group or an alkenyl group having 2 to 15 carbon atoms and t represents an integer of 1 to 8. The above compound can be obtained by the reaction of an olefin having 2 to 15 carbon atoms or a dimer, a trimer or a tetramer thereof with a sulfurizing agent such as sulfur and sulfur chloride. As the olefin, propylene, isobutene and diisobutene are preferable.

The dihydrocarbyl polysulfide is a compound represented by the following general formula (XIX):

$$R^{58}-S_u-R^{59} \quad \text{(XIX)}$$

wherein $R^{58}$ and $R^{59}$ each represents an alkyl group or a cyclic alkyl group having 1 to 20 carbon atoms, an aryl group having 6 to 20 carbon atoms, an alkylaryl group having 7 to 20 carbon atoms or an arylalkyl group having 7 to 20 carbon atoms and may represent the same group or different groups and u represents an integer of 2 to 8. When $R^{58}$ and $R^{59}$ represent alkyl groups, the compound represented by general formula (XIX) is called an alkyl sulfide.

Examples of the groups represented by $R^{58}$ or $R^{59}$ in the above general formula (XIX) include methyl group, ethyl group, n-propyl group, isopropyl group, n-butyl group, isobutyl group, sec-butyl group, tert-butyl group, various types of pentyl group, various types of hexyl group, various types of heptyl group, various types of octyl group, various types of nonyl group, various types of decyl group, various types of dodecyl group, cyclohexyl group, cyclooctyl group, phenyl group, naphthyl group, tolyl group, xylyl group, benzyl group and phenetyl group.

Examples of the dihydrocarbyl polysulfide include dibenzyl polysulfide, di-tert-nonyl polysulfide, didodecyl polysulfide, di-tert-butyl polysulfide, dioctyl polysulfide, diphenyl polysulfide and dicyclohexyl polysulfide.

Examples of the thiocarbamate include zinc dithiocarbamate. Examples of the thioterpene include reaction products of phosphorus pentasulfide and pinene. Examples of the dialkyl thiodipropionate include dilauryl thiodipropionate and distearyl thiodipropionate.

In the present invention, the extreme pressure agent may be used singly or in combination of two or more. It is preferable that one or more types of agents selected from the metal salts of carboxylic acids and the extreme pressure agents having phosphorus are used. It is more preferable that the metal salts of carboxylic acids and the extreme pressure agents having phosphorus are used in combination. In the latter case, one or more types of salts selected from the metal salts of carboxylic acids and one or more types of agents selected from the extreme pressure agents having phosphorus are used.

The extreme pressure agents such as the extreme pressure agents having phosphorus and the other agents described above are used in an amount in the range of 0.001 to 5% by weight and preferably in the range of 0.01 to 3% by weight based on the amount of the composition. When the amount is less than 0.001% by weight, there is the possibility that the lubrication property is insufficient. When the amount exceeds 5% by weight, there is the possibility that formation of sludge is promoted.

The refrigerating oil composition for a carbon dioxide refrigerant of the present invention may further comprise antioxidants.

As the antioxidant, phenolic antioxidants such as 2,6-di-tert-buyl-4-methylphenol, 2,6-di-tert-butyl-4-ethylphenol, 2,2'-methylenebis(4-methyl-6-tert-butylphenol) and amine antioxidants such as phenyl-α-naphthyl-amine, phenyl-p-naphthylamine and N,N'-diphenyl-p-phenylenediamine are preferable. The antioxidant is used in an amount in the range of 0.01 to 5% by weight and preferably in the range of 0.05 to 3% by weight based on the amount of the composition. When the amount is less than 0.01% by weight, the effect is occasionally insufficient. Even when the amount exceeds 5% by weight, further improvement in the effect cannot be expected. When the antioxidant described above is used in combination with the acid scavenger and the extreme pressure agent described above, the effect of further improving the stability of the refrigerating oil can be exhibited when the refrigerating oil is exposed to carbon dioxide in the condition of the supercritical condition.

To the refrigerating oil composition of the present invention, various conventional additives may also be suitably added as long as the object of the present invention is not adversely affected. Examples of the conventional additives include copper inactivating agents such as benzotriazole and derivatives thereof including N-(N,N'-dialkylamino-methyl)tolutriazoles in which the alkyl group has 3 to 12 carbon atoms and defoaming agents such as silicone oils and fluorosilicone oils. The additives are comprised in the refrigerating oil composition in an amount in the range of 0.001 to 3% by weight.

In the present invention, any carbon dioxide refrigerant can be used as long as the refrigerant comprises carbon dioxide as the main component. The refrigerant may further comprise hydrocarbon refrigerants such as propane and isobutane, ammonia refrigerants and refrigerants containing fluorine such as hydrofluorocarbons and fluorocarbons, a typical example of which is 1,1,1,2-tetrafluorocarbon (R-134a). Even when the refrigerant comprises the above components other than carbon dioxide, the effect of the present invention can be exhibited as long as the refrigerant comprises carbon dioxide as the main component and preferably 90% by weight or more of carbon dioxide.

In the process for lubricating refrigerators using the refrigerating oil composition of the present invention, the ratio of the amounts by weight of the carbon dioxide refrigerant to the refrigerating oil composition is in the range of 99/1 to 10/90 and preferably in the range of 95/5 to 30/70. When the above ratio is smaller than the above range, the refrigerating ability decreases. When the above ratio exceeds the above range, the lubricating property deteriorates. Therefore, ratios outside the above range are not preferable.

Figure 1:
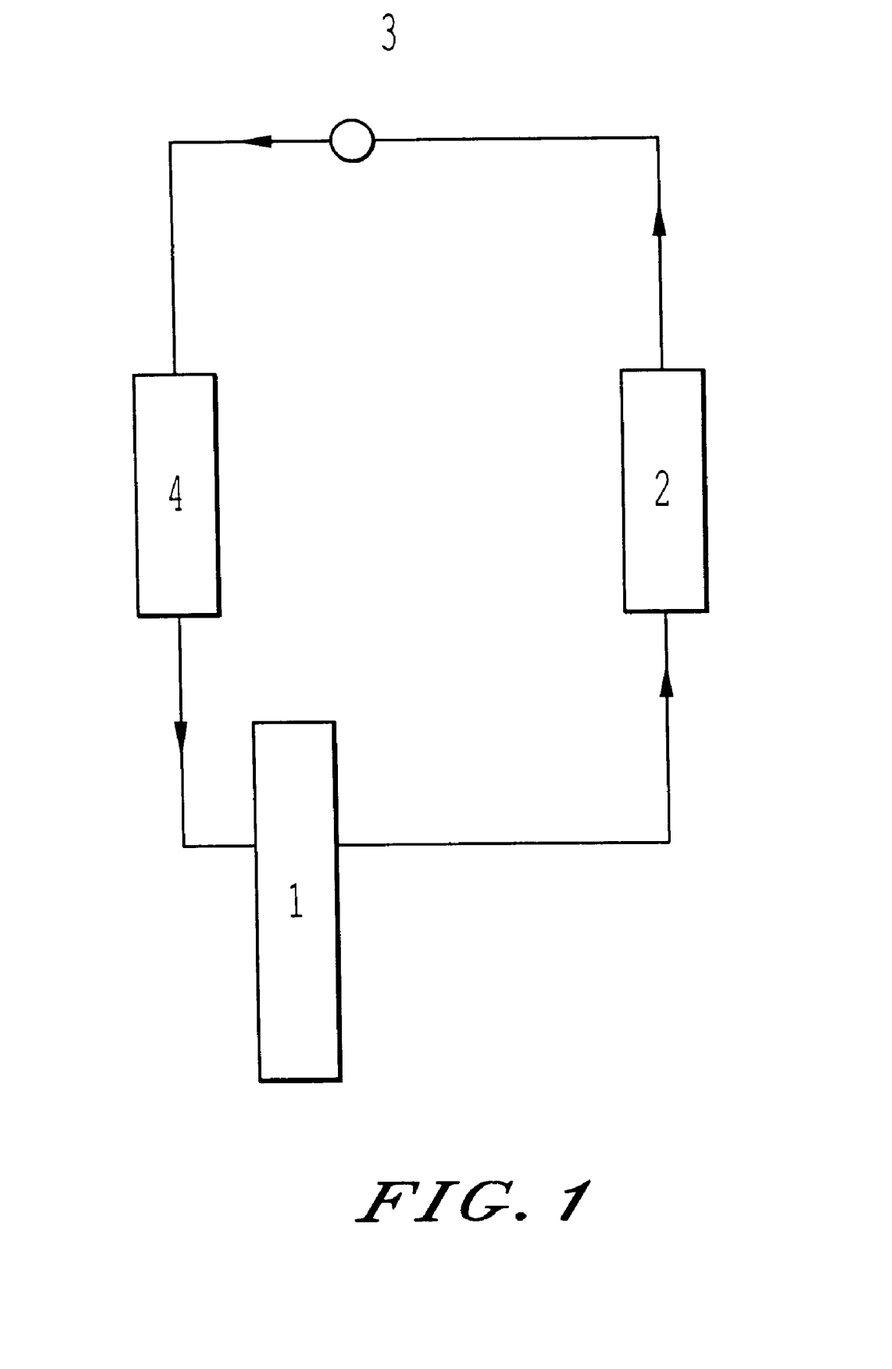
FIG. 1 shows a flow diagram exhibiting an example of the compression-type refrigerating cycle in which the refrigerating oil composition of the present invention is used.
Figure 2:
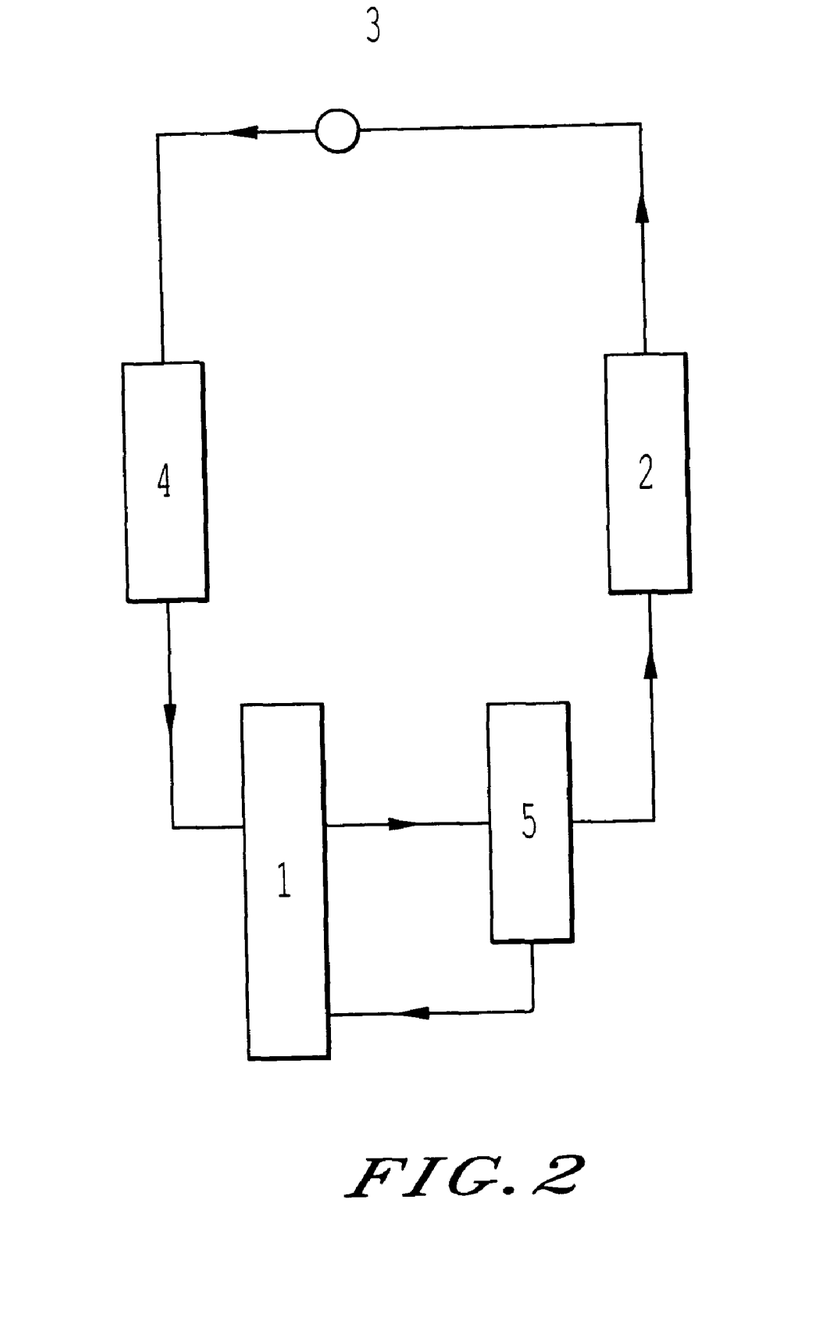
FIG. 2 shows a flow diagram exhibiting another example of the compression-type refrigerating cycle in which the refrigerating oil composition of the present invention is used.
Figure 3:
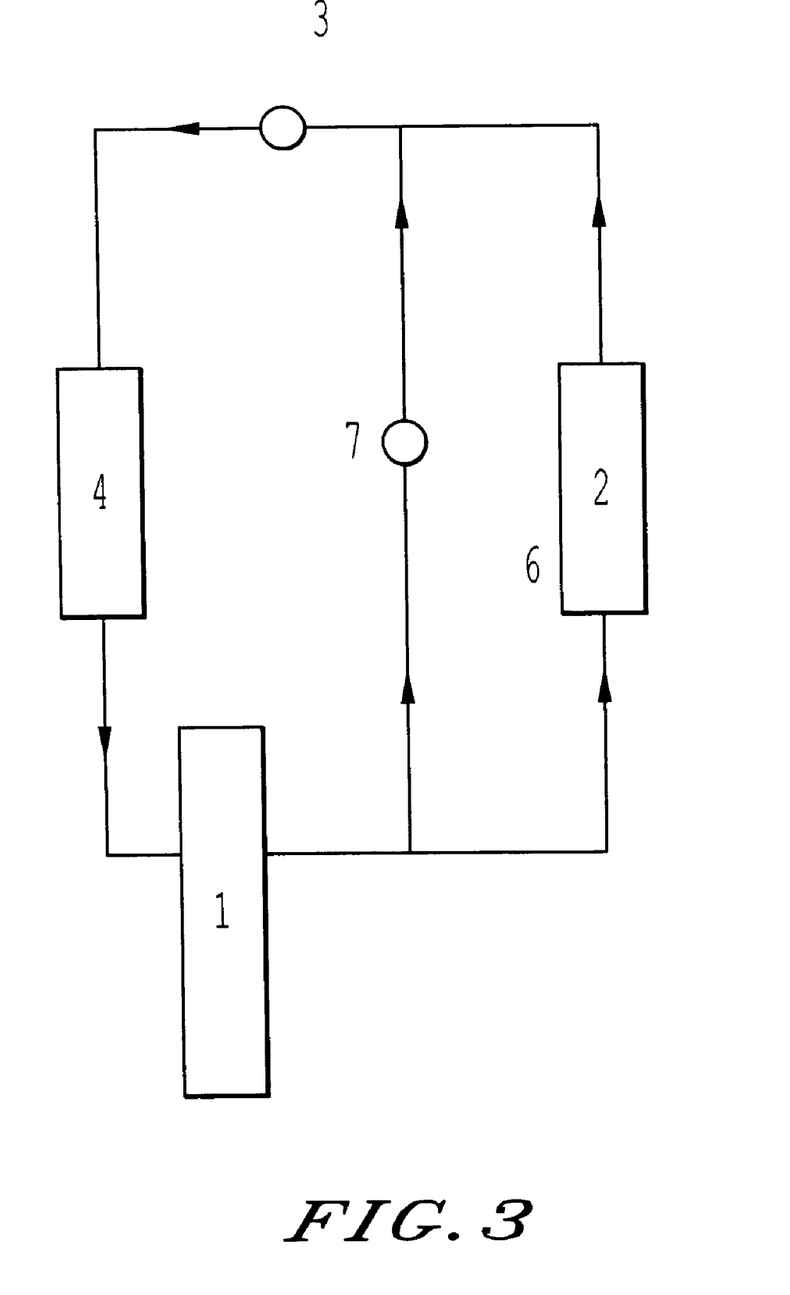
FIG. 3 shows a flow diagram exhibiting still another example of the compression-type refrigerating cycle in which the refrigerating oil composition of the present invention is used.
Figure 4:
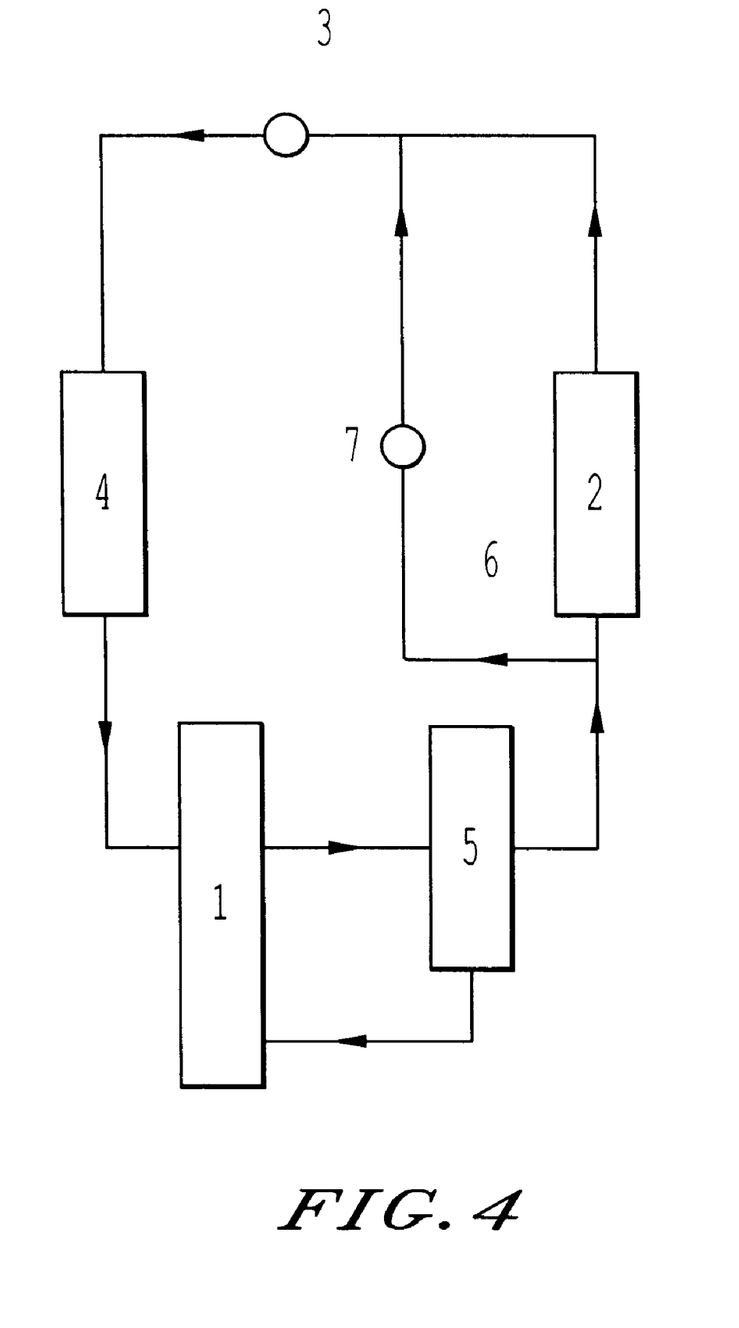
FIG. 4 shows a flow diagram exhibiting still another example of the compression-type refrigerating cycle in which the refrigerating oil composition of the present invention is used.

The refrigerating oil composition of the present invention can be applied to various types of refrigerators. It is preferable that the refrigerating oil of the present invention is applied to compression-type refrigerating cycles in compression-type refrigerators. For example, the advantageous effects can be exhibited when the refrigerating oil composition of the present invention is applied to compression-type refrigerating cycles having at least one of an oil separator and a hot gas line such as the refrigerating cycles shown in FIGS. 1 to 4. In general, a compression-type refrigerating cycle is constituted with a compressor, a condenser, an expansion valve and an evaporator. As the lubricant for a refrigerator, a lubricant exhibiting excellent miscibility with the refrigerant used for the refrigerator is used. However, when a refrigerant comprising carbon dioxide as the main component is used for the above refrigerating cycle and the refrigerator is lubricated with a conventional refrigerating oil, a stable operation for a long period time cannot be achieved due to poor wear resistance or insufficient stability. In particular, this drawback is marked when a capillary tube is used as the expansion valve in the refrigerating cycle such as those of electric refrigerators and small air conditioners. The refrigerating oil composition of the present invention can be effectively used even when a compression-type refrigerating cycle having at least one of an oil separator and a hot gas line is operated with the use of a refrigerant comprising carbon dioxide as the main component.

As described in detail in the above, in the present invention, (1) the refrigerating oil composition comprises (A) a polyvinyl ether having a kinematic viscosity in the range of 3 to 50 mm$^2$/s at 100° C. in an amount exceeding 40% by weight and of 99.1% by weight or less and (B) a polyoxyalkylene glycol having a kinematic viscosity in the range of 3 to 50 mm$^2$/s at 100° C. in an amount of 0.1% by weight or more and less than 40% by weight and exhibits excellent miscibility with refrigerants comprising carbon dioxide as the main component.

(2) The refrigerating oil composition for a carbon dioxide refrigerant which is obtained by adding the acid scavenger to the composition described in (1) exhibits excellent stability under the atmosphere of carbon dioxide in the supercritical condition while the above excellent miscibility is maintained. The refrigerating oil composition for a carbon dioxide refrigerant which is obtained by adding the acid scavenger and the extreme pressure agent, and preferably by adding a combination of the metal salt of a carboxylic acid and the extreme pressure agent having phosphorus, to the composition described in (1) exhibits excellent stability and lubricating property under the atmosphere of carbon dioxide in the supercritical condition and can be used for a long period of time.

The present invention will be described more specifically with reference to examples in the following.

The test methods used in the examples are as follows.

[Test of Stability]

Into an autoclave having an inner volume of 120 ml, 40 g of a sample of a lubricating oil, 40 g of a gas of a carbon dioxide refrigerant and a metal catalyst containing copper, aluminum and iron were placed and water was added to the system in an amount such that the content of water was adjusted to 2,000 ppm. The autoclave was closed and kept at 175° C. for 10 days. Then, the sample of the lubricating oil was analyzed. The pressure inside the system during the test was 16 MPa.

[Test of Friction]

Using a ring made of steel (SUJ-2) and a block made of aluminum (A4032), the decrease in the amount (mg) of the block by wear was measured in the atmosphere of a gas of a carbon dioxide refrigerant in accordance with the LFW-1 friction test in the closed system. The conditions of the test was as follows: the amount of the sample of the lubricant: 100 ml; the temperature of the oil: 50° C.; the pressure of the carbon dioxide gas: 2 MPa; the speed of rotation: 300 rpm; the load: 1372 N; and the time of the test: 60 minutes.

[Compounds Used as the Base Oil]

Compounds shown in Table 1 were used as the base oil in Examples and Comparative Examples. The base oils contained 1.5% by weight of α-olefin oxides and 0.5% by weight of di-tert-butyl-4-methylphenol.

TABLE 1

| Sample No. | Type of sample | Base oil | Kinematic viscosity at 100° C. (mm$^2$/s) | Viscosity index |
|---|---|---|---|---|
| I | PVE-1 | copolymer of polyethyl vinyl ether and polyisobutyl vinyl ether [9:1, ratio by mole] | 8.2 | 85 |
| II | PVE-2 | polyethyl vinyl ether | 10.2 | 86 |
| III | PAG-1 | polyoxypropylene glycol dimethyl ether | 10.9 | 208 |
| IV | PAG-2 | polyoxyethyleneoxypropylene glycol dimethyl ether (PO:EO = 9:1, ratio by mole) | 9.9 | 218 |

[Preparation of a Metal Salt of a Carboxylic Acid]

Using dipropylene glycol as the solvent, oleic acid as the carboxylic acid and potassium hydroxide as the alkali hydroxide, the carboxylic acid and the alkali hydroxide were brought into reaction and a 30% by weight solution of potassium oleate was prepared.

Examples 1 to 4 and Comparative Examples 1 and 2

The test of stability and the test of friction were conducted using the compositions shown in Table 2. In Table 2, the amount of the extreme pressure agent is shown based on the amount of the composition. The results of the tests are shown in Table 3.

In Table 2, the extreme pressure agents are abbreviated as follows:

TCP: tricresyl phosphate

TNP: trisnonylphenyl phosphite

DOHP: dioleyl hydrogenphosphite

TABLE 2

| | Base oil (% by weight) | Potassium oleate (% by weight) | Extreme pressure agent | | Viscosity index | Kinematic viscosity at 100° C. (mm$^2$/s) |
|---|---|---|---|---|---|---|
| | | | type | amount (% by weight) | | |
| Example 1 | PVE-1(95) + PAG-1(5) | 1.0 | TCP | 1.0 | 95 | 7.9 |
| Example 2 | PVE-1(90) + PAG-1(10) | 0.5 | TNP | 1.0 | 102 | 8.0 |
| Example 3 | PVE-2(70) + PAG-1(30) | 0.5 | TCP | 1.0 | 130 | 8.3 |
| Example 4 | PVE-1(80) + PAG-2(20) | 1.0 | DOHP | 1.0 | 115 | 8.1 |
| Comparative Example 1 | PVE-1(100) | 0.5 | TCP | 1.0 | 85 | — |
| Comparative Example 2 | PVE-2(100) | 0.5 | TCP | 1.0 | 86 | — |

TABLE 3

| | Autoclave test | | | Total acid value after test (mg KOH/g) | Amount of wear (mg) |
|---|---|---|---|---|---|
| | appearance of oil | precipitates | metal catalyst | | |
| Example 1 | good | none | no change | 0.08 | 3.6 |
| Example 2 | good | none | no change | 0.09 | 2.5 |
| Example 3 | good | none | no change | 0.08 | 1.07 |
| Example 4 | good | none | no change | 0.07 | 1.6 |
| Comparative Example 1 | good | none | no change | 0.07 | 4.4 |
| Comparative Example 2 | good | none | no change | 0.06 | 4.1 |

INDUSTRIAL APPLICABILITY

The present invention relates to the refrigerating oil composition for a refrigerator using a carbon dioxide ($CO_2$) refrigerant. The refrigerating oil composition can be used for compression-type refrigerators using a carbon dioxide refrigerant and, specifically, for refrigerating and air conditioning apparatuses such as automobile air conditioners, refrigerators, freezers, air conditioners and heat pumps. The miscibility with the refrigerant containing carbon dioxide as the main component is improved and the stability under the atmosphere of carbon dioxide in the supercritical condition is excellent. Therefore, the refrigerating oil composition can be used for a long period of time.

What is claimed is:

1. A composition which comprises as a main component a mixture comprising:

(A) a polyvinyl ether having a kinematic viscosity in a range of 3 to 50 mm²/s at 100° C. in an amount exceeding 40% by weight and of 99.1% by weight or less and

(B) a polyoxyalkylene glycol having a kinematic viscosity in a range of 3 to 50 mm²/s at 100° C. in an amount of 0.1% by weight or more and less than 40% by weight, wherein the polyoxyalkylene glycol is a compound represented by general formula (I):

$$R^1\text{—}[(OR^2)_m\text{—}OR^3]_n \quad (I)$$

wherein
$R^1$ represents hydrogen atom, an alkyl group having 1 to 3 carbon atoms, or an acyl group having 2 to 10 carbon atoms;
$R^2$ represents an alkylene group having 2 to 4 carbon atoms;
$R^3$ represents hydrogen atom, an alkyl group having 1 to 3 carbon atoms or an acyl group having 2 to 10 carbon atoms;
n represents an integer of 1 to 6; and
m represents numbers giving an average value of numbers represented by m×n in a range of 6 to 80.

2. The composition according to claim 1, which has a kinematic viscosity in a range of 3 to 50 mm²/s at 100° C. and a viscosity index of 90 or greater.

3. The composition according to claim 1, wherein the polyvinyl ether is a compound represented by general formula (V):

(V)

wherein $R^{16}$, $R^{17}$ and $R^{18}$ each represents a hydrogen atom or a hydrocarbon group having 1 to 8 carbon atoms and the atoms and the groups represented by $R^{16}$, $R^{17}$ and $R^{18}$ may be the same with or different from each other; $R^{19}$ represents a divalent hydrocarbon group having 1 to 10 carbon atoms; $R^{20}$ represents a hydrocarbon group having 1 to 20 carbon atoms; k represents numbers giving an average value in a range of 0 to 10; the atoms and the groups represented by $R^{16}$ to $R^{20}$ may be the same with or different from each other among constituting units; and, when a plurality of $R^{19}O$ are present, each $R^{19}O$ group may be the same as or different than other $R^{19}O$ groups.

4. The composition according to claim 1, which comprises an acid scavenger.

5. The composition according to claim 4, which comprises 0.005 to 5.0% by weight of the acid scavenger.

6. The composition according to claim 1, which comprises an extreme pressure agent.

7. The composition according to claim 6, wherein the extreme pressure agent is at least one agent selected from metal salts of carboxylic acids and extreme pressure agents having phosphorus.

8. The composition according to claim 6, which comprises 0.001 to 5.0% by weight of the extreme pressure agent.

9. The composition according to claim 1, wherein the carbon dioxide refrigerant comprises 90% by weight or more of carbon dioxide.

10. A composition which comprises as a main component a mixture comprising (A) a polyvinyl ether having a kinematic viscosity in a range of 3 to 50 mm²/s at 100° C. in an amount exceeding 40% by weight and of 99.1% by weight or less and (B) a polyoxyalkylene glycol having a kinematic viscosity in a range of 3 to 50 mm²/s at 100° C. in an amount of 0.1% by weight or more and less than 40% by weight, wherein the polyoxyalkylene glycol is a compound represented by general formula (I):

$$R^1\text{—}[(OR^2)_m\text{—}OR^3]_n \quad (I)$$

wherein
$R^1$ represents an alkyl group having 1 to 3 carbon atoms;
$R^2$ represents an alkylene group having 2 to 4 carbon atoms;
$R^3$ represents an alkyl group having 1 to 3 carbon atoms;
n represents an integer of 1 to 6; and
m represents numbers giving an average value of numbers represented by m×n in a range of 6 to 80.

11. The composition of claim 1, wherein $R^1$ is a methyl group.

12. The composition of claim 1, wherein $OR^2$ is selected from the group consisting of an oxyethylene group, an oxypropylene group and an oxybutylene group.

13. The composition of claim 1, wherein the polyoxyalkylene compound comprises two or more types of oxyalkylene groups.

14. The composition of claim 1, wherein the polyoxyalkylene compound comprises a copolymer comprising an oxyethylene (EO) group and an oxypropylene (PO) group.

15. The composition of claim 14, wherein the polyoxyalkylene compound has a value of EO/(PO+EO) in the range of 0.1 to 0.8.

16. The composition of claim 14, wherein the polyoxyalkylene compound has a value of EO/(PO+EO) in the range of 0.3 to 0.6.

17. The composition of claim 1, wherein $R^3$ is a methyl group.

18. A refrigerating oil composition for a carbon dioxide refrigerant that comprises the composition of claim 1.

19. A refrigerating oil composition formulated for use in a refrigerator or freezer that comprises the composition of claim 1.

20. A refrigerating oil composition formulated for use in an air conditioner or heat exchanger that comprises the composition of claim 1.

* * * * *